(12) United States Patent
Luo et al.

(10) Patent No.: US 10,543,451 B2
(45) Date of Patent: Jan. 28, 2020

(54) AMMONIA-ADDING SYSTEM FOR AMMONIA-BASED DESULFURIZATION DEVICE

(71) Applicant: Jiangnan Environmental Protection Group Inc., Grand Cayman (KY)

(72) Inventors: Jing Luo, NanJing (CN); Jinyong Wang, NanJing (CN); Jun Zhang, NanJing (CN)

(73) Assignee: Jiangnan Environmental Protection Group Inc., Grand Cayman OT (KY)

( * ) Notice: Subject to any disclaimer, the term of this patent is extended or adjusted under 35 U.S.C. 154(b) by 0 days.

(21) Appl. No.: 16/158,481

(22) Filed: Oct. 12, 2018

(65) Prior Publication Data

US 2019/0054414 A1 Feb. 21, 2019

Related U.S. Application Data

(63) Continuation of application No. 15/953,703, filed on Apr. 16, 2018, now Pat. No. 10,159,929, which is a
(Continued)

(30) Foreign Application Priority Data

Jun. 14, 2017 (CN) .......................... 2017 1 0446925

(51) Int. Cl.
| | | |
|---|---|---|
| *B01D 53/14* | (2006.01) | |
| *B01D 53/34* | (2006.01) | |
| *B01D 53/50* | (2006.01) | |

(52) U.S. Cl.
CPC ..... *B01D 53/1412* (2013.01); *B01D 53/1481* (2013.01); *B01D 53/1493* (2013.01);
(Continued)

(58) Field of Classification Search
CPC ................ B01D 53/1412; B01D 53/14; B01D 53/1481; B01D 53/1493; B01D 2252/102; B01D 2252/103
See application file for complete search history.

(56) References Cited

U.S. PATENT DOCUMENTS

| | | |
|---|---|---|
| 2,810,627 A | 10/1957 | Johnstone et al. |
| 3,752,877 A | 8/1973 | Beavon |

(Continued)

FOREIGN PATENT DOCUMENTS

| | | |
|---|---|---|
| CL | 201301147 | 4/2013 |
| CL | 201501470 | 5/2015 |

(Continued)

OTHER PUBLICATIONS

Office Action issued in U.S. Appl. No. 14/829,905 dated Nov. 16, 2015.
(Continued)

*Primary Examiner* — Cabrena Holecek
(74) *Attorney, Agent, or Firm* — Weiss & Arons LLP

(57) ABSTRACT

Ammonia-adding apparatus and methods for ammonia-based desulfurization use multi-stage control, calculate a theoretical amount of ammonia based on gas amounts provided by an inlet continuous emission monitoring system (CEMS) and an outlet CEMS of the ammonia-based desulfurization device or associated gas amounts, a $SO_2$ concentration provided by the inlet CEMS, and a predetermined $SO_2$ concentration of the outlet CEMS. The apparatus and methods calculate a corrected theoretical amount of ammonia using half of the ratio of the actual amount of added ammonia to the actual amount of removed sulfur dioxide as a correction coefficient for the theoretical amount of ammonia; add an ammonia absorbent equivalent to the corrected theoretical amount of ammonia to the ammonia-based desulfurization device through an ammonia metering means and
(Continued)

an ammonia control valve, and automatically control the actual ammonia flow rate based on the actual $SO_2$ concentration and a change trend provided by the outlet CEMS.

30 Claims, 2 Drawing Sheets

Related U.S. Application Data continuation of application No. 15/661,186, filed on Jul. 27, 2017, now Pat. No. 10,099,170.

(52) U.S. Cl.
CPC ........... *B01D 53/346* (2013.01); *B01D 53/50* (2013.01); *B01D 2252/102* (2013.01); *B01D 2252/103* (2013.01); *Y02A 50/2346* (2018.01)

(56) References Cited

U.S. PATENT DOCUMENTS

| | | | |
|---|---|---|---|
| 3,983,217 A | 9/1976 | Muraki et al. | |
| 4,208,381 A | 6/1980 | Isahaya et al. | |
| 4,250,160 A | 2/1981 | Eakman | |
| 4,294,590 A | 10/1981 | Linde et al. | |
| 4,324,776 A | 4/1982 | Kim | |
| 4,378,977 A | 4/1983 | Linde et al. | |
| 4,552,747 A | 11/1985 | Goar | |
| 4,690,807 A | 9/1987 | Saleem | |
| 5,019,361 A | 5/1991 | Hakka | |
| 5,106,607 A | 4/1992 | Chopin et al. | |
| 5,362,458 A | 11/1994 | Saleem et al. | |
| 5,632,967 A | 5/1997 | Nasato | |
| 5,720,926 A | 2/1998 | Whipp et al. | |
| 6,063,352 A | 5/2000 | Risse et al. | |
| 6,066,304 A | 5/2000 | Freetly et al. | |
| 6,139,807 A | 10/2000 | Risse et al. | |
| 6,221,325 B1 | 4/2001 | Brown et al. | |
| 6,444,185 B1 | 9/2002 | Nougayrede et al. | |
| 6,508,998 B1 | 1/2003 | Nasato | |
| 6,569,398 B2 | 5/2003 | Fenderson | |
| 6,616,908 B2 | 9/2003 | Watson et al. | |
| 6,776,974 B1 | 8/2004 | Burmaster et al. | |
| 6,991,771 B2 | 1/2006 | Duncan et al. | |
| 7,351,392 B2 | 4/2008 | Chen et al. | |
| 7,635,408 B2 | 12/2009 | Mak et al. | |
| 7,648,692 B2 | 1/2010 | Chow et al. | |
| 7,754,471 B2 | 7/2010 | Chen et al. | |
| 7,879,135 B2 | 2/2011 | Ravikumar et al. | |
| 7,910,077 B2 | 3/2011 | Chow et al. | |
| 8,178,070 B2 | 5/2012 | Wong et al. | |
| 8,206,669 B2 | 6/2012 | Schaffer et al. | |
| 8,361,432 B2 | 1/2013 | Parekh et al. | |
| 8,444,943 B2 | 5/2013 | Lamar | |
| 8,545,793 B2 | 10/2013 | Thielert | |
| 8,871,176 B2 | 10/2014 | Liu et al. | |
| 9,370,745 B2 | 6/2016 | Xu et al. | |
| 2003/0175190 A1 | 9/2003 | Duncan et al. | |
| 2007/0248518 A1 | 10/2007 | Jung et al. | |
| 2009/0004070 A1 | 1/2009 | Chow et al. | |
| 2011/0195008 A1 | 8/2011 | Menzel et al. | |
| 2011/0243822 A1 | 10/2011 | Mortson | |
| 2015/0209720 A1 | 7/2015 | Komatsu et al. | |
| 2015/0209723 A1 | 7/2015 | Takahashi et al. | |
| 2015/0300231 A1* | 10/2015 | Panziera | B01D 53/228 95/9 |
| 2015/0352489 A1 | 12/2015 | Luo et al. | |

FOREIGN PATENT DOCUMENTS

| | | |
|---|---|---|
| CL | 201600812 | 4/2016 |
| CL | 201701698 | 6/2017 |
| CN | 1280032 A | 1/2001 |
| CN | 201880482 U | 6/2001 |
| CN | 1377722 A | 11/2002 |
| CN | 1178735 C | 4/2003 |
| CN | 1408464 A | 4/2003 |
| CN | 2568291 Y | 8/2003 |
| CN | 1164480 C | 9/2004 |
| CN | 2640584 Y | 9/2004 |
| CN | 2640585 Y | 9/2004 |
| CN | 2668235 Y | 1/2005 |
| CN | 1617831 A | 5/2005 |
| CN | 2746971 Y | 12/2005 |
| CN | 2746972 Y | 12/2005 |
| CN | 2746973 Y | 12/2005 |
| CN | 2754711 Y | 2/2006 |
| CN | 1251965 C | 4/2006 |
| CN | 2772609 Y | 4/2006 |
| CN | 2778373 Y | 5/2006 |
| CN | 2799059 Y | 7/2006 |
| CN | 2799060 Y | 7/2006 |
| CN | 1283346 C | 11/2006 |
| CN | 1321723 C | 6/2007 |
| CN | 101085410 A | 12/2007 |
| CN | 201030298 Y | 3/2008 |
| CN | 201052456 Y | 4/2008 |
| CN | 100395006 C | 6/2008 |
| CN | 201109711 Y | 9/2008 |
| CN | 100428979 C | 10/2008 |
| CN | 201129965 Y | 10/2008 |
| CN | 201132102 Y | 10/2008 |
| CN | 101352642 A | 1/2009 |
| CN | 201179415 Y | 1/2009 |
| CN | 100460045 C | 2/2009 |
| CN | 100475313 C | 4/2009 |
| CN | 101422693 A | 5/2009 |
| CN | 201231130 Y | 5/2009 |
| CN | 101524620 | 9/2009 |
| CN | 201320447 Y | 10/2009 |
| CN | 201333376 Y | 10/2009 |
| CN | 101575103 A | 11/2009 |
| CN | 101585511 A | 11/2009 |
| CN | 201380037 Y | 1/2010 |
| CN | 201380038 Y | 1/2010 |
| CN | 201380039 Y | 1/2010 |
| CN | 201380040 Y | 1/2010 |
| CN | 100588608 C | 2/2010 |
| CN | 101642629 A | 2/2010 |
| CN | 201423237 Y | 3/2010 |
| CN | 101274750 B | 6/2010 |
| CN | 101745303 A | 6/2010 |
| CN | 201492952 U | 6/2010 |
| CN | 201529487 U | 7/2010 |
| CN | 201529488 U | 7/2010 |
| CN | 201537456 U | 8/2010 |
| CN | 101274196 B | 12/2010 |
| CN | 101182926 B | 1/2011 |
| CN | 101519192 B | 2/2011 |
| CN | 101579600 B | 4/2011 |
| CN | 102000490 A | 4/2011 |
| CN | 102012034 A | 4/2011 |
| CN | 101456541 B | 5/2011 |
| CN | 101576261 B | 5/2011 |
| CN | 101579602 B | 5/2011 |
| CN | 102061206 A | 5/2011 |
| CN | 101274204 B | 6/2011 |
| CN | 101670231 B | 8/2011 |
| CN | 201912884 U | 8/2011 |
| CN | 201912885 U | 8/2011 |
| CN | 201944861 U | 8/2011 |
| CN | 201949808 U | 8/2011 |
| CN | 201969488 U | 9/2011 |
| CN | 102205202 A | 10/2011 |
| CN | 102380305 A | 3/2012 |
| CN | 102381685 A | 3/2012 |
| CN | 102381686 A | 3/2012 |
| CN | 102423597 A | 4/2012 |
| CN | 101791517 B | 5/2012 |
| CN | 102451604 A | 5/2012 |
| CN | 202237765 U | 5/2012 |
| CN | 101456540 B | 7/2012 |
| CN | 101574614 B | 7/2012 |

(56) References Cited

FOREIGN PATENT DOCUMENTS

| | | | |
|---|---|---|---|
| CN | 101637685 B | 7/2012 | |
| CN | 102631827 A | 8/2012 | |
| CN | 202460375 U | 10/2012 | |
| CN | 202460420 U | 10/2012 | |
| CN | 202460438 U | 10/2012 | |
| CN | 101530727 B | 11/2012 | |
| CN | 101955828 B | 11/2012 | |
| CN | 102211762 B | 11/2012 | |
| CN | 101972592 B | 12/2012 | |
| CN | 202538627 U | 12/2012 | |
| CN | 101934191 B | 1/2013 | |
| CN | 102049186 B | 1/2013 | |
| CN | 202725003 U | 2/2013 | |
| CN | 202751942 U | 2/2013 | |
| CN | 202754802 U | 2/2013 | |
| CN | 202829575 U | 3/2013 | |
| CN | 101418246 B | 4/2013 | |
| CN | 202912691 U | 5/2013 | |
| CN | 202924730 U | 5/2013 | |
| CN | 202953829 U | 5/2013 | |
| CN | 202962224 U | 6/2013 | |
| CN | 102381687 B | 8/2013 | |
| CN | 203159221 U | 8/2013 | |
| CN | 203253348 U | 10/2013 | |
| CN | 203264545 U | 11/2013 | |
| CN | 203291675 U | 11/2013 | |
| CN | 102489140 B | 12/2013 | |
| CN | 103418223 A | 12/2013 | |
| CN | 203329558 U | 12/2013 | |
| CN | 203612955 U | 5/2014 | |
| CN | 102942162 B | 8/2014 | |
| CN | 203781842 U | 8/2014 | |
| CN | 102910593 B | 9/2014 | |
| CN | 102847431 B | 10/2014 | |
| CN | 103204477 B | 10/2014 | |
| CN | 103446859 B | 10/2014 | |
| CN | 104138713 A | 11/2014 | |
| CN | 103301732 B | 1/2015 | |
| CN | 103041679 B | 2/2015 | |
| CN | 103301736 B | 2/2015 | |
| CN | 104368231 A | 2/2015 | |
| CN | 204134465 U | 2/2015 | |
| CN | 204151066 U | 2/2015 | |
| CN | 102895870 B | 3/2015 | |
| CN | 102923670 B | 3/2015 | |
| CN | 204198421 U | 3/2015 | |
| CN | 103223292 B | 4/2015 | |
| CN | 104555939 A | 4/2015 | |
| CN | 204233957 U | 4/2015 | |
| CN | 103112831 B | 5/2015 | |
| CN | 204352660 U | 5/2015 | |
| CN | 103301705 B | 8/2015 | |
| CN | 103482583 B | 9/2015 | |
| CN | 104923046 A | 9/2015 | |
| CN | 104927894 A | 9/2015 | |
| CN | 104941423 A | 9/2015 | |
| CN | 104946296 A | 9/2015 | |
| CN | 103463949 B | 12/2015 | |
| CN | 105110819 A | 12/2015 | |
| CN | 105126573 A | 12/2015 | |
| CN | 104353258 B | 1/2016 | |
| CN | 104249995 B | 4/2016 | |
| CN | 205235588 U | 5/2016 | |
| CN | 205245200 U | 5/2016 | |
| CN | 205252720 U | 5/2016 | |
| CN | 205252721 U | 5/2016 | |
| CN | 205252722 U | 5/2016 | |
| CN | 205262780 U | 5/2016 | |
| CN | 103822217 B | 6/2016 | |
| CN | 105749729 | 7/2016 | |
| CN | 105757688 A | 7/2016 | |
| CN | 104555940 B | 8/2016 | |
| CN | 105841168 A | 8/2016 | |
| CN | 104524948 B | 9/2016 | |
| CN | 205549846 U | 9/2016 | |
| CN | 205562498 U | 9/2016 | |
| CN | 205650071 U | 10/2016 | |
| CN | 103521060 B | 1/2017 | |
| CN | 103939918 B | 1/2017 | |
| CN | 104208992 B | 2/2017 | |
| CN | 104258713 B | 2/2017 | |
| CN | 106422705 | 2/2017 | |
| CN | 104528659 B | 4/2017 | |
| DE | 3733319 A1 | 9/1989 | |
| EP | 165609 B1 | 6/1985 | |
| EP | 212523 A2 | 3/1987 | |
| EP | 2987549 | 2/2016 | |
| EP | 2987549 A1 | 2/2016 | |
| JP | S47-043737 | 11/1972 | |
| JP | S51151669 | 12/1976 | |
| JP | 2002028530 | 1/2002 | |
| JP | 2009279490 A | 3/2009 | |
| TW | 497985 | 8/2002 | |
| WO | WO200507505 A1 | 8/2005 | |
| WO | WO2005113429 A1 | 12/2005 | |
| WO | WO2006113935 A2 | 10/2006 | |
| WO | WO2012152919 A1 | 11/2012 | |

OTHER PUBLICATIONS

Office Action issued in U.S. Appl. No. 14/829,905 dated Feb. 29, 2016.
Office Action issued in U.S. Appl. No. 14/829,909 dated Apr. 15, 2016.
Office Action issued in U.S. Appl. No. 14/829,909 dated Dec. 14, 2016.
Office Action issued in U.S. Appl. No. 14/829,909 dated Feb. 14, 2017.
International Search Report issued for International Application No. PCT/CN2013/074657, dated Dec. 26, 2013.
International Search Report issued for International Application No. PCT/CN2014/087887, dated Jan. 14, 2015.
Supplementary European Search Report issued in European Application No. 13882863.7, dated Mar. 11, 2016.
Google Patents English translation of CN1283346C.
Google Patents English translation of CN2640585Y.
Google Patents English translation of CN2772609Y.
Google Patents English translation of CN100428979C.
Google Patents English translation of CN201912885U.
Google Patents English translation of CN10322392A.
"Introduction to FGD for China Shenhua Coal to Liquid(CTL) Project," Jiangnan Environmental Technology, Inc., 19th Annual Electric Power Conference and Exhibition, Apr. 13, 2017, Chicago, Illinois.
"Advantages & Application of Efficient Ammonia-Based Desulfurization Technology," Jiangnan Environmental Technology, Inc., 19th Annual Electric Power Conference and Exhibition, Apr. 13, 2017, Chicago, Illinois.
Jing Luo et al., U.S. Appl. No. 15/481,736, filed Apr. 7, 2017.
Jing Luo et al., U.S. Appl. No. 15/618,975, filed Jun. 9, 2017.
Jing Luo et al., U.S. Appl. No. 10/016,721, filed Jun. 9, 2017.
Office Action issued by the Japanese Intellectual Property Office in Japanese Application No. 2017-123088, dated Apr. 16, 2018.
Wende Xiao and Zhiquan Wu, "Sulfur Dioxide Removal and Recovery," Chemical Industry Press (China), 143-145, May 2001.
Yang Yang, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhuo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.
Shengli Cao, "Coal Chemical Product Technology," Metallurgical Industry Press (China), 43, Jun. 2003.

(56) References Cited

OTHER PUBLICATIONS

Office Action issued by the Brazilian Intellectual Property Office, dated Feb. 25, 2019.
Office Action issued by the Chilean Intellectual Property Office, dated Jul. 1, 2019.
European Examination Report, dated Jul. 2, 2019.
Examination Report issued by the Indian Intellectual Property Office, dated May 28, 2019.
Office Action issued by the Japanes Intellectual Property Office, dated Jul. 4, 2018.
Office Action issued by the Japanese Intellectual Property Office, dated Apr. 23, 2019.

* cited by examiner

AMMONIA-ADDING SYSTEM FOR AMMONIA-BASED DESULFURIZATION DEVICE

This application claims priority under 35 U.S.C. § 119 of Chinese Patent Application No. 201710446925.2, filed on Jun. 14, 2017, which is hereby incorporated herein in its entirety.

TECHNICAL FIELD

The present invention belongs to the field of environmental protection technologies, and in particular to an ammonia-adding system for an ammonia-based desulfurization device.

BACKGROUND

At present, limestone desulfurization process and ammonia-based desulfurization process are mainstream processes in the whole world for removing sulfur dioxide from gases. In the limestone desulfurization process, large quantities of waste water and gypsum residues are produced during desulfurization, and a lot of investment and operating costs are required to treat these waste water and waste residues. Also, in the limestone desulfurization process, while 1 ton of sulfur dioxide is removed, about 0.7 ton of carbon dioxide is produced synchronously. With ammonia-based desulfurization process, basically no waste water or waste residue is produced, and added ammonia desulfurizer is converted into a useful ammonium sulfate fertilizer, thus it is more environmentally friendly. However, the existing ammonia-based desulfurization process often has the problems, such as ammonia escape, aerosol formation, etc.

Chinese patents CN 1283346C and CN 1321723C disclose a process for removing $SO_2$ from coal-fired flue gas by using ammonia as a removal agent, in which the $SO_2$ concentration in the clean gas is less than 100 $mg/Nm^3$. However, the amount of ammonia escaping in the clean gas can be up to 12 $mg/Nm^3$.

Chinese Patent CN 100428979C discloses an ammonia-based desulfurization process with crystallization inside a tower and an apparatus thereof, wherein the desulfurization tower is designed to be of a multi-section structure, successively including an oxidation section, a crystallization section, a cooling absorption section, a main absorption section, and a dehydration-demisting section from bottom to top. In the process, the evaporating ability of flue gas is utilized for crystallization to reduce operation energy consumption, the $SO_2$ concentration in the clean gas is less than 200 $mg/Nm^3$, and the ammonia content in the clean gas can be as low as 3 $mg/Nm^3$.

Chinese patent application No. CN 201710154157.3 discloses a method and a device for ammonia-based removal of sulfur oxides and dust from gas, wherein the device consists of a gas purification and removal system, an oxidation system, an ammonium sulfate post-processing system, an ammonia supply system and an auxiliary system, and uses a process of multipoint ammonia addition and multi-stage control, thereby significantly inhibiting ammonia escape and aerosol formation, and achieving efficient desulfurization and dedusting effects.

Chinese patent application No. CN 201610322999.0 discloses a pH-based automatically adjusting ammonia addition system, mainly including a control cabinet, an aqueous ammonia tank, a first aqueous ammonia pump, a second aqueous ammonia pump, a pressure transmitter, an electromagnetic flowmeter, an electric control valve and a pH transducer, wherein the control cabinet is respectively connected to the pressure transmitter, the electromagnetic flowmeter, the electric control valve, and the pH transducer; the control cabinet is connected to the first aqueous ammonia pump and the second aqueous ammonia pump; the inlet end of the first aqueous ammonia pump is connected to the aqueous ammonia tank and the outlet end of the first aqueous ammonia pump is respectively connected to an inlet of an ammonia addition chamber and an inlet of a circulating pump; the first aqueous ammonia pump is respectively connected to the pressure transmitter, the electromagnetic flowmeter, the electric control valve and the pH transducer; the inlet end of the second aqueous ammonia pump is connected to the aqueous ammonia tank and the outlet end of the second aqueous ammonia pump is respectively connected to the inlet of the ammonia addition chamber and the inlet of the circulating pump; the second aqueous ammonia pump is respectively connected to the pressure transmitter, the electromagnetic flowmeter, the electric control valve and the pH transducer; and the electric control valve is respectively connected to the inlet of the ammonia addition chamber and the inlet of the circulating pump.

An automatic ammonia-adding system with stable and reliable system operation, a high automation degree and a simple process and being applicable to an ammonia-based desulfurization device is still required to achieve automatic multipoint ammonia addition and multi-stage control in the ammonia-based desulfurization device, and inhibit ammonia escape and aerosol formation.

It would therefore be desirable to provide improved apparatus and methods for adding ammonia to a flue gas desulfurization system to overcome shortcomings in the prior art.

SUMMARY

An object of the disclosure is to provide an ammonia-adding system with stable and reliable system operation, a high automation degree and a simple process and being applicable to an ammonia-based desulfurization device. The automatic ammonia-adding system may be used with a method and a device for ammonia-based removal of sulfur oxides and dust from gas disclosed in Chinese patent application No. CN 201710154157.3.

BRIEF DESCRIPTION OF THE DRAWINGS

Objects and advantages of the invention will be apparent upon consideration of the following detailed description, taken in conjunction with the accompanying drawings, in which like reference characters refer to like parts throughout, and in which.

Figure 1:
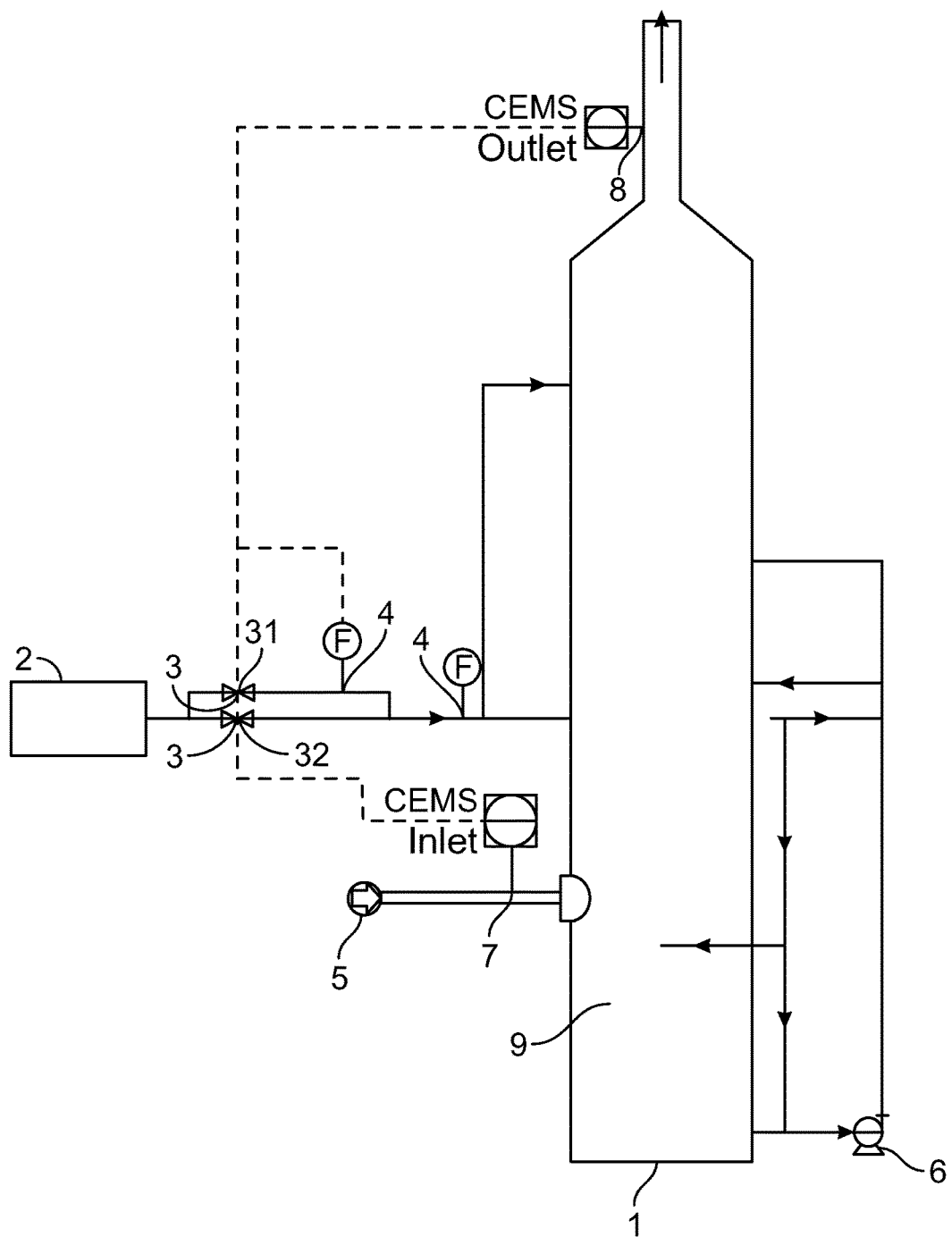
FIG. 1 is a schematic diagram of an embodiment in accordance with the principles of the invention.

The drawings are exemplifications of the principles of the invention and are not intended to limit the invention to the particular embodiments illustrated.

DETAILED DESCRIPTION

Definitions

"Ammonia recovery" means that fraction or percentage of ammonia added to a gas cleaning process that is subsequently captured and extracted from the process.

"Dust" means a particulate material fine enough to waft along gaseous flows, when handled, processed, or contacted. It includes but is not limited to aerosols, including solid aerosol particles and liquid aerosol particles, soot, charcoal, non-combusted coal, fine minerals, sand, gravel, salts, and any combination thereof.

"$NO_x$" means a chemical species containing nitrogen and oxygen.

In the event that the above definitions or a description stated elsewhere in this application is inconsistent with a meaning (explicit or implicit) that is commonly used, set forth in a dictionary, or stated in a source incorporated by reference into this application, the application and the claim terms in particular are understood to be construed according to the definition or description in this application, and not according to the common definition, dictionary definition, or the definition that was incorporated by reference. In the event that a claim term can only be understood if it is construed by a dictionary, a definition set forth in the Kirk-Othmer Encyclopedia of Chemical Technology, 5th Edition, 2005, (John Wiley & Sons, Inc.) shall control, if provided therein.

Apparatus and methods for adding ammonia to an absorption solution in a flue gas desulfurization system are provided.

The apparatus and methods may involve an automatic ammonia-adding system for an ammonia-based desulfurization device. The apparatus may automatically calculate a theoretical amount of ammonia based on gas amounts provided by an inlet Continuous Emission Monitoring System (CEMS) and an outlet CEMS of the ammonia-based desulfurization device (or associated gas amounts), a $SO_2$ concentration provided by the inlet CEMS, and a predetermined $SO_2$ concentration of the outlet CEMS. The apparatus may calculate a corrected theoretical amount of ammonia using half of the ratio of the actual amount of added ammonia to the actual amount of removed sulfur dioxide as a correction coefficient for the theoretical amount of ammonia. The apparatus may add an ammonia absorbent equivalent to the corrected theoretical amount of ammonia (for example, within one or more of the ranges ±10%, ±5%, ±3%, ±2% the corrected theoretical amount) to the ammonia-based desulfurization device through an ammonia metering means and an ammonia control valve, and then may control the actual ammonia flow rate based on the actual $SO_2$ concentration and and a change trend provided by the outlet CEMS as a feedback.

The gas amounts of the inlet and outlet CEMS (or associated gas amounts, such as boiler activity characteristics from a boiler with which the desulfurization device is operated), the $SO_2$ concentrations of the inlet and outlet CEMS, and the data of the ammonia metering may be uploaded to a distributed control system to calculate the actual amount of added ammonia and the actual amount of removed sulfur dioxide, and then calculate the theoretical amount of ammonia, the correction coefficient for the amount of ammonia, and the corrected theoretical amount of ammonia.

The theoretical amount of ammonia, the correction coefficient for the theoretical amount of ammonia, and the corrected theoretical amount of ammonia may be calculated as follows:

theoretical amount of ammonia=(gas amount of the inlet CEMS or associated gas amount ($Nm^3/h$) *inlet $SO_2$ concentration(mg/$Nm^3$)−gas amount of the outlet CEMS or associated gas amount ($Nm^3/h$)*predetermined $SO_2$ concentration of the outlet CEMS (mg/$Nm^3$))/1000/1000/64*34 kg/h correction coefficient for theoretical amount of ammonia=actual molar number of added ammonia/actual molar number of removed sulfur dioxide/2 corrected theoretical amount of ammonia=theoretical amount of ammonia*correction coefficient for theoretical amount of ammonia The apparatus may use an outlet $SO_2$ concentration as a term in the correction coefficient for the theoretical amount of ammonia. Different correction coefficients can be set according to different ranges of the $SO_2$ concentration, such as 20-30, 50-80, 120-170 mg/$Nm^3$ and so on.

The apparatus may use a slope of a temporal curves of the outlet $SO_2$ concentration value to determine the outlet $SO_2$ concentration change trend. Different further correction coefficients can be used for different observed slopes (for example, when the slope takes on values such as less than 0, 0-1, 1-2, etc.).

The methods may include adding ammonia to the absorption solution at a base rate that is proportional to: a) a target sulfur dioxide removal rate; and b) a correction coefficient that includes a ratio of cumulative ammonia added to cumulative sulfur dioxide removed. The methods may include; after the adding, controlling ammonia addition to a second rate based on a measured output sulfur dioxide characteristic.

The methods may include dispensing ammonia through a valve at 90-99% the base rate.

The valve may be a main ammonia dispensing valve. The methods may include dispensing ammonia through an auxiliary ammonia dispensing valve at a rate that is the base rate minus the rate at which ammonia is dispensed through the main ammonia dispensing valve.

The main valve may have a throughput setting. The methods may include quantifying a rate of change of sulfur dioxide at an inlet of the system; and determining that the rate of change is not greater than a threshold. The controlling may include, simultaneously: maintaining the main valve at the throughput setting; and adjusting the auxiliary valve.

The threshold rate of change may be 2%.

The method may include quantifying a rate of change of sulfur dioxide at an inlet of the system; and determining that the rate of change is greater than a threshold. The controlling may include: resetting the main valve from the throughput setting to a new throughput setting; and, simultaneously: maintaining the main valve at the new throughput setting; and adjusting the auxiliary valve.

In the adding, the target sulfur dioxide removal rate may be defined as a difference between: (a) the product of: (i) a gas flow rate corresponding to an inlet of the system and (ii) an inlet $SO_2$ concentration; and (b) the product of: (i) a gas flow rate corresponding to an outlet of the system and (ii) a predetermined $SO_2$ outlet concentration.

The methods may include receiving at a distributed control system ("DCS") a steam generation rate from a boiler that produces the flue gas; and evaluating the gas flow rate corresponding to the inlet as the steam generation rate. The evaluating may include using the steam generation rate, or a term proportional to the steam generation rate, as a proxy, in a targeted sulfur dioxide removal rate calculation, for the gas flow rate corresponding to the inlet.

The method may include receiving at a distributed control system ("DCS") a steam generation rate from a boiler that produces the flue gas; and evaluating the gas flow rate corresponding to the outlet as the boiler load. The evaluating may include using the steam generation rate, or a term proportional to the steam generation rate, as a proxy, in a targeted sulfur dioxide removal rate calculation, for the gas flow rate corresponding to the outlet.

The methods may include receiving at a distributed control system ("DCS") a boiler air flow rate from a boiler that produces the flue gas; and evaluating the gas flow rate corresponding to the inlet as the boiler air flow rate. The evaluating may include using the boiler air flow rate, or a term proportional to the boiler air flow rate, as a proxy, in a targeted sulfur dioxide removal rate calculation, for the gas flow rate corresponding to the inlet.

The methods may include receiving at a distributed control system ("DCS") a boiler air flow rate from a boiler that produces the flue gas; and evaluating the gas flow rate corresponding to the outlet as the boiler airflow rate. The evaluating may include using the boiler air flow rate, or a term proportional to the boiler air flow rate, as a proxy, in a targeted sulfur dioxide removal rate calculation, for the gas flow rate corresponding to the outlet.

The methods may include receiving at a distributed control system ("DCS"), from a continuous emission monitoring system, a flue gas inlet flow rate corresponding to an inlet of the system; and evaluating the gas flow rate corresponding to the inlet as the flue gas inlet flow rate.

The methods may include receiving at a distributed control system ("DCS"), from a continuous emission monitoring system, a flue gas outlet flow rate corresponding to the outlet of the system; and evaluating the gas flow rate corresponding to the outlet as the flue gas outlet flow rate.

The methods may include measuring the flue gas inlet flow rate. The methods may include measuring the flue gas outlet flow rate.

In the adding, the correction coefficient may be defined as: one half of: a ratio of actual molar number of added ammonia to actual molar number of removed sulfur dioxide. The actual molar numbers may be tallied over a time period. The time period may be a period of days, a period of weeks, a period of months, a period of years, or any other suitable period.

The adding may include regulating the base rate to be: (a) no less than 90% of a product of: (i) ammonia stoichiometrically required by the target sulfur dioxide removal rate and (ii) the correction coefficient; and (b) no more than 110% of the product.

The adding may include regulating the base rate to be: (a) no less than 95% of a product of: (i) ammonia stoichiometrically required by the target sulfur dioxide removal rate and (ii) the correction coefficient; and (b) no more than 105% of the product.

The adding may include regulating the base rate to be: (a) no less than 98% of a product of: (i) ammonia stoichiometrically required by the target sulfur dioxide removal rate and (ii) the correction coefficient; and (b) no more than 102% of the product.

The target sulfur dioxide removal rate depends on a preset outlet sulfur dioxide concentration. The ammonia stoichiometrically required may be:

$$\frac{\begin{pmatrix} \text{gas flow rate} \\ \text{corresponding to} \\ \text{an inlet of the} \\ \text{system, Nm}^3/\text{h} \end{pmatrix} \begin{pmatrix} SO_2 \text{ concentration} \\ \text{at the inlet, mg/Nm}^3 \end{pmatrix} - \begin{pmatrix} \text{gas flow rate} \\ \text{corresponding to} \\ \text{an outlet of the} \\ \text{system, Nm}^3/\text{h} \end{pmatrix} \begin{pmatrix} \text{preset } SO_2 \text{ concentration} \\ \text{at outlet, mg/Nm}^3 \end{pmatrix}}{(1,000 \text{ mg/g})(1000 \text{ g/kg})(64 \text{ mg } SO_2/34 \text{ mg } NH_3)}.$$

The methods may include receiving, at a distributed control system ("DCS"), from an inlet continuous electronic monitoring instrument, the gas flow rate corresponding to the inlet of the system.

The methods may include receiving, at a distributed control system ("DCS"), from an inlet continuous electronic monitoring instrument, the $SO_2$ concentration at the inlet of the system.

The methods may include receiving, at a distributed control system ("DCS"), from an outlet continuous electronic monitoring instrument, the gas flow rate corresponding to the outlet of the system.

The controlling may include: receiving at a distributed control system ("DCS") a sulfur dioxide concentration at an outlet of the desulfurization system; and changing the correction coefficient in response to the sulfur dioxide concentration.

The valve may be a main ammonia dispensing valve, and the methods may include dispensing ammonia through an auxiliary ammonia dispensing valve at a rate that is the base rate minus the rate at which ammonia is dispensed through the main ammonia dispensing valve. The methods may include changing the rate of dispensing through the auxiliary ammonia dispensing valve in response to a predefined relationship between: (a) a rate of change of sulfur dioxide emission rate at an outlet of the system; and (b) a fine adjustment value. The fine adjustment value may correspond to a throughput setting of the auxiliary valve. The fine adjustment value may correspond to a change in a throughput setting of the auxiliary valve.

The controlling may include changing the correction coefficient in response to a sulfur dioxide concentration at an outlet of the desulfurization system.

The method may include measuring only one of: (a) the gas flow rate corresponding to the inlet of the system; and (b) the gas flow rate corresponding to the outlet of the system; and evaluating the other one as the measured one. The evaluating may include using the measured rate as a proxy, in a targeted sulfur dioxide removal rate calculation, for the rate not measured.

The methods may include receiving at a distributed control system ("DCS") a flue gas characteristic; and correcting the other rate based on the flow characteristic. The other rate may be the rate not measured. The flow characteristic may be a flue gas temperature. The flow characteristic may be a flue gas pressure. The flow characteristic may be a flue gas water content.

The absorption liquid may include at least one ammonia or amine based compound, including but not limited to ammonium salts, ammonium ions ($NH_4^+$), ammonium sulfate, ammonium sulfite, and any combination thereof. The liquid may be water.

The apparatus and methods may include an oxidation section, an absorption section and a fine particulate control section in the absorption tower.

The apparatus may include an ammonia-adding system for an ammonia-based desulfurization device. The apparatus may use multi-stage control. The apparatus may include a processor. The processor may calculate a theoretical amount of required ammonia based on flue gas amounts provided by an inlet continuous emission monitoring system ("CEMS") and an outlet CEMS of the ammonia-based desulfurization device or associated gas amounts, an $SO_2$ concentration provided by the inlet CEMS, and a predetermined $SO_2$ concentration of the outlet CEMS. The processor may calculate a corrected theoretical amount of ammonia using half of the ratio of the actual amount of added ammonia to the actual amount of removed sulfur dioxide as a correction coefficient for the theoretical amount of ammonia. The apparatus may provide addition of an ammonia absorbent equivalent to the corrected theoretical amount of ammonia ±10% to the ammonia-based desulfurization device through an ammonia metering means and an ammonia control valve. The apparatus may automatically control the actual ammonia flow rate based on the actual $SO_2$ concentration and a change trend. One or both of the actual $SO_2$ concentration and the change trend may be provided by the outlet CEMS as a feedback.

The apparatus may include an absorption tower, an ammonia supply system, an ammonia control valve, an ammonia metering means, a circulating pump, an inlet CEMS, an outlet CEMS and an oxidation section.

The gas amounts of the inlet and outlet CEMS or associated gas amounts, the $SO_2$ concentrations of the inlet and outlet CEMS, and the data of the ammonia metering may be uploaded to the DCS to calculate the actual amount of added ammonia and the actual amount of removed sulfur dioxide, and then calculate the theoretical amount of ammonia, the correction coefficient for the amount of ammonia, and the corrected theoretical amount of ammonia.

The theoretical amount of ammonia, the correction coefficient for the theoretical amount of ammonia, and the corrected theoretical amount of ammonia may be calculated as follows:

theoretical amount of ammonia=(gas amount of the inlet CEMS or associated gas amount ($Nm^3/h$) *inlet $SO_2$ concentration ($mg/Nm^3$)−gas amount of the outlet CEMS or associated gas amount ($Nm^3/h$)*predetermined $SO_2$ concentration of the outlet CEMS ($mg/Nm^3$))/1000/1000/64*34 kg/h          Theoretical Amount of Ammonia:

correction coefficient for theoretical amount of ammonia=ratio of actual molar number of added ammonia to actual molar number of removed sulfur dioxide/2     Correction Coefficient for Theoretical Amount of Ammonia:

corrected theoretical amount of ammonia=theoretical amount of ammonia*correction coefficient for theoretical amount of ammonia.     Corrected Theoretical Amount Of Ammonia:

An outlet $SO_2$ concentration gradient (change in concentration per unit of time) may be a term in the correction coefficient for the theoretical amount of ammonia.

A slope of curve of the outlet $SO_2$ concentration value may be evaluated to assess an outlet $SO_2$ concentration change trend.

The ammonia absorbent supplied by the apparatus may be one or more of liquid ammonia, aqueous ammonia and gas ammonia.

The apparatus may include one or more ammonia control valves. The apparatus may include two ammonia control valves. The apparatus may include a plurality of ammonia control valves having different control abilities.

A control valve with a large control ability may be used to control the corrected theoretical amount of ammonia. A control valve with a small, or fine, control ability may be used for automatic feedback adjustment and control.

The apparatus may include a flow meter or a metering pump for metering or adding ammonia.

The inlet CEMS may output one or more of water content, temperature and pressure of the flue gas.

The outlet CEMS may output one or more of water content, temperature and pressure of the flue gas.

A boiler may be associated with the desulfurization device. The boiler may receive heat from hot gas that is then exhausted as flue gas for treatment by the desulfurization device. The apparatus may substitute for one or both of the inlet and outlet CEM gas amounts a boiler steam generation rate (tons per unit of time, for example) (a "boiler load") and a boiler air amount.

The apparatus may substitute the inlet CMS gas amount for the outlet CMS gas amount. The apparatus may substitute the outlet CMS gas amount for the inlet CMS gas amount.

One or more of the water content, temperature and pressure data of the inlet and outlet CEMS may be used for gas-amount correction.

Some embodiments are discussed with reference to FIG. 1. In some embodiments, the apparatus may include ammonia supply system 2, ammonia control valve 3, ammonia metering means 4, inlet CEMS 7 and outlet CEMS 8. In some embodiments, the apparatus may include absorption tower 1, ammonia supply system 2, ammonia control valve 3, ammonia flow meter 4, circulating pump 6, inlet CEMS 7, outlet CEMS 8 and oxidation section 9.

The apparatus may provide an ammonia absorbent, which may be one or more of liquid ammonia, aqueous ammonia and gaseous ammonia.

The apparatus may include one or more ammonia control valves. The apparatus may include two or more ammonia control valves. The valves may have different control abilities. For example, one or more of the valves may have large (coarse) control ability, and one or more of the valves may have fine control ability. A control valve with a large control ability may be used to control 90-99% amount of ammonia. A control valve with a small control ability may be used for automatic feedback adjustment and control.

In some embodiments, the ammonia metering means may include one or both of a flow meter, e.g. a volumetric flow meter or a mass flow meter, and a metering pump.

In some embodiments, the measured items for the inlet CEMS may include one or more of a gas amount (flow rate), a gas $SO_2$ concentration, a gas water content, a gas dust content, a gas temperature, and a gas pressure.

In some embodiments, the measured items for the outlet CEMS may include one or more of a gas amount, a gas $SO_2$ concentration, a gas water content, a gas dust content, a gas temperature, a gas pressure, a gas nitrogen oxide content, and a gas free ammonia content.

In some embodiments, associated gas amounts, e.g. gas amounts calculated from a boiler load, a boil air volume or other parameters may be used to substitute for one or both of a CEMS gas inlet amount and a CEMS gas outlet amount. In some embodiments, one of a CEMS gas inlet amount and a CEMS gas outlet amount can be substituted for the other.

In some embodiments, one or more of a gas water content, a gas temperature and a gas pressures of the inlet or outlet CEMS can be used for gas amount correction calculation.

In some embodiments, an ammonia-based desulfurization device using apparatus and methods may include one or more of the following illustrative process steps:

A raw flue gas enters from the middle-lower part of an absorption tower.

An ammonia supply system provides supplemental ammonia absorbent via an ammonia control valve to predetermined ammonia-adding points, such as an oxidation section of an absorption tower, a circulating pump, etc., thereby achieving automatic ammonia addition to the desulfurization system.

The circulating washing liquid (ammonia absorbent) may be concentrated (crystallized) in a cooling-and-washing process, and then processed to an ammonium sulfate product through an ammonium sulfate post-processing system.

The raw flue gas is emitted from a flue gas outlet on the top of the tower after cooling-and-washing, washing for desulfurization, and removing fine particulate matters by a washing liquid circulated by a circulating pump.

A specific illustrative embodiment of the apparatus and methods is now described with reference to FIG. 1 and FIG. 2, wherein the automatic ammonia-adding system includes an absorption tower 1, ammonia supply system 2, ammonia control valve 3, ammonia metering means 4, circulating pump 6, inlet CEMS 7, outlet CEMS 8 and oxidation section 9.

A Distributed Control System (DCS) automatically calculates a theoretical amount of ammonia using a microprocessor based on gas amounts provided by inlet CEMS 7 and outlet CEMS 8 (or associated gas amounts), an $SO_2$ concentration provided by the inlet CEMS 7 and a predetermined $SO_2$ concentration of outlet CEMS 8; calculates a corrected theoretical amount of ammonia using half of the ratio of the actual amount of added ammonia to the actual amount of removed sulfur dioxide as a correction coefficient for the theoretical amount of ammonia; adds an ammonia absorbent equivalent to the corrected theoretical amount of ammonia (for example, within one or more of the ranges ±10%, ±5%, ±3%, ±2% the corrected theoretical amount), to the ammonia-based desulfurization device through ammonia metering means 4 and ammonia control valve 3; and then automatically controls the actual ammonia flow rate based on the actual $SO_2$ concentration and change trend provided by the outlet CEMS 8 as a feedback, thereby achieving automatic ammonia addition.

Different correction coefficients can be set according to different ranges of the $SO_2$ concentration (such as 20-30, 50-80, 120-170 mg/Nm$^3$, and so on).

A slope of a curve of the outlet $SO_2$ value may be used as a basis for calculation, and different correction coefficients can be set at different slopes (the outlet $SO_2$ concentration change trend, e.g. less than 0, 0-1, 1-2, etc.).

The ammonia absorbent supplied by the ammonia supply system 2 may be 20% aqueous ammonia.

Dual control valves may be used to control automatic ammonia addition. The inlets of ammonia control valves 3 may be connected to ammonia supply system 2. Outlets of ammonia control valves 3 may be connected to ammonia addition points, such as oxidization section 9 and the circulation pump 6. The amount of ammonia added through the main ammonia control valve may be, for example, 98% of the corrected theoretical amount of ammonia.

The measured items for inlet CEMS 7 may include one or more of a gas amount, a gas $SO_2$ concentration, a gas water content, a gas dust content, a gas temperature and gas pressure.

The measured items for outlet CEMS 8 may include one or more of a gas amount, a gas $SO_2$ concentration, a gas water content, a gas dust content, a gas temperature, a gas pressure, a gas nitrogen oxide content, and a gas free ammonia content.

Ammonia supply system 2 may include one or more of an aqueous ammonia tank, an aqueous ammonia unloading pump, an aqueous ammonia supply pump, an accident spray device and a breathing gas washing tank. An aqueous ammonia having a concentration of 20 wt.-% may be supplied as an ammonia absorbent. The ammonia metering means may include a mass flow meter.

An illustrative ammonia-based desulfurization process using the apparatus and methods may include one or more of the following steps:

Raw flue gas 5 enters from the middle-lower part of the absorption tower 1.

Ammonia supply system 2 provides supplemental aqueous ammonia absorbent, via main ammonia control valve 31 and an auxiliary ammonia control valve 32, to ammonia addition points, such as oxidization section 9 and circulation pump 6.

A circulating washing liquid may be oxidized, then concentrated to a solid content of 10-20 wt.-% in a cooling-and-washing process, and then processed to an ammonium sulfate product through an ammonium sulfate post-processing system.

Gas 5 then may be emitted from a flue gas outlet on the top of the tower successively after cooling-and-washing, washing for desulfurization, and removing fine particulate matters by a washing liquid circulated by circulation pump 6.

In the ammonia-based desulfurization process, illustrative ammonia addition control steps are as follows:

1) uploading the gas amounts of inlet CEMS 7 and outlet CEMS 8 (or associated gas amounts), the $SO_2$ concentrations of inlet CEMS 7 and outlet CEMS 8, and ammonia metering data to the distributed control system (DCS), wherein the water content, temperature and pressure data of the inlet CEMS and the outlet CEMS can be used for the gas amount correction calculation;
2) predetermining the outlet $SO_2$ concentration by the DCS;
3) calculating the theoretical amount of ammonia;
4) calculating the correction coefficient for the theoretical amount of ammonia;
5) calculating the corrected theoretical amount of ammonia
6) controlling the ammonia flow rate to be 98% of the corrected theoretical amount of ammonia through mass flow meter 4 and main ammonia control valve 31;
7) acquiring the actual $SO_2$ concentration of the outlet CEMS by the DCS;
8) controlling auxiliary ammonia control valve 32 based on the actual $SO_2$ concentration and change trend of the outlet CEMS as a feedback to allow the outlet $SO_2$ concentration to tend towards the predetermined $SO_2$ concentration; and
9) acquiring the actual ammonia flow rate, and integrating the actual ammonia flow rate over time; and acquiring the actual amount of removed sulfur dioxide, and integrating the actual amount of removed sulfur dioxide over time, by the DCS to conduct the next round of control.

The apparatus and methods may improve the automation degree of an ammonia-based desulfurization device through automatic ammonia addition, may have $SO_2$ concentration and total dust in the outlet clean flue gas that do not exceed standards because of inlet gas amount and $SO_2$ concentration fluctuations, and may reduce investment by making use of measured quantities at the inlet and outlet CEMS, automatic statistics and the computing function of the distributed control system.

Under the conditions that the $SO_2$ concentration is not more than 30000 mg/$Nm^3$ and the total dust concentration is not more than 50 mg/$Nm^3$ in the raw flue gas, the ammonia-based desulfurization device may achieve a $SO_2$ concentration in the clean flue gas of no more than 35 mg/$Nm^3$, a total dust (including aerosol) concentration of no more than 5 mg/$Nm^3$, an ammonia escape of no more than 3 mg/$Nm^3$, and an ammonia recovery of no less than 99%.

The following embodiment is provided for the purpose of illustration, not limitation.

Embodiment 1

Figure 2:
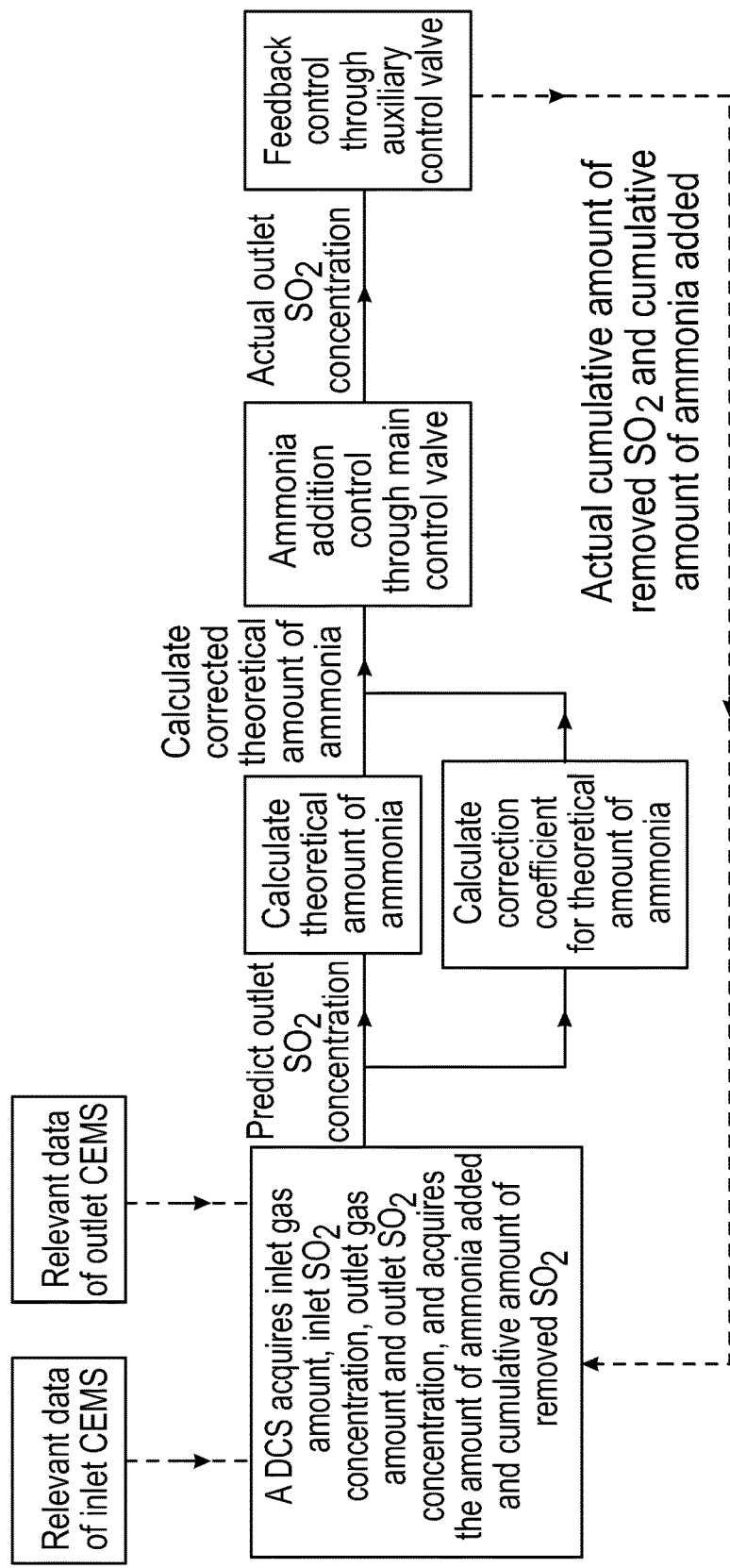
FIG. 2 is a control scheme of automatic ammonia addition in accordance with the principles of the invention.

A raw flue gas was treated using the apparatus and methods, as shown in FIG. 1, wherein 1 is an absorption tower, 2 is an ammonia supply system, 3 is an ammonia control valve, 4 is a mass flow meter as an ammonia metering means, 5 is the raw flue gas, 6 is a circulating pump, 7 is an inlet CEMS, 8 is an outlet CEMS, and 9 is an oxidation section. The gas amount of the raw flue gas is 360,000-510,000 $Nm^3$/h, the $SO_2$ concentration is 1,000-30,000 mg/$Nm^3$, and the total dust concentration is 15-30 mg/$Nm^3$.

An ammonia absorbent supplied by ammonia supply system 2 is liquid ammonia.

Dual control valves, i.e, a main ammonia control valve 31 and an auxiliary ammonia control valve 32, are used to control automatic ammonia addition, wherein the inlets of the ammonia control valves 3 are connected to the ammonia supply system 2, the outlets of the ammonia control valves 3 are connected to the ammonia addition points, such as the oxidization section 9 and the circulation pump 6, and the amount of ammonia added through the main ammonia control valve 31 is 99% of the corrected theoretical amount of ammonia.

The measured items for the inlet CEMS 7 include gas amount, $SO_2$ concentration, $NO_x$ content, water content, dust content, temperature and pressure.

The measured items for the outlet CEMS 8 include gas amount, $SO_2$ concentration, water content, dust content, temperature, pressure, nitrogen oxides content and free ammonia content.

The ammonia supply system 2 includes a liquid ammonia spherical tank, an ammonia unloading compressor, an ammonia supply pump and an accident spray device, and the ammonia metering means 4 is a mass flow meter.

Raw flue gas 5 enters from the middle-lower part of absorption tower 1, and is then emitted from the flue gas outlet on the top of the tower successively after cooling-and-washing, washing for desulfurization, and removing fine particulate matters by a washing liquid circulated by circulating pump 6.

Ammonia supply system 2 provides supplemental liquid ammonia absorbent through main ammonia control valve 31 and auxiliary ammonia control valve 32 to the ammonia addition points, such as oxidization section 9 and circulation pump 6.

The circulating washing liquid is oxidized, then concentrated to a solid content of 15 wt.-% in the cooling-and-washing process, and then processed to an ammonium sulfate product through an ammonium sulfate post-processing system.

Illustrative control steps were as follows:

1) acquiring relevant data by a DCS: an inlet gas amount of 395000 $Nm^3$/h, an inlet $SO_2$ concentration of 2112 mg/$Nm^3$, an outlet gas amount of 405000 $Nm^3$/h, an outlet $SO_2$ concentration of 24 mg/$Nm^3$, an actual cumulative amount of added liquid ammonia of 1940 t, and an actual cumulative amount of removed sulfur dioxide of 3653 t;

2) predetermining the outlet $SO_2$ concentration of 23.9 mg/$Nm^3$ by the DCS;

3) calculating a theoretical amount of ammonia= (395000*2112−405000*23.9)/1000/1000/64*34=438 kg/h;

4) calculating a correction coefficient for the theoretical amount of ammonia=1940/34/3653*64=0.9997;

5) calculating a corrected theoretical amount of ammonia=438*0.9997=437.85 kg/h 6) controlling the ammonia flow rate to 433.47 kg/h through mass flow meter 4 and main ammonia control valve 31;

7) acquiring the actual $SO_2$ concentration of the outlet CEMS 23.9 mg/$Nm^3$;

8) controlling auxiliary ammonia control valve 32 based on the actual $SO_2$ concentration and change trend of the outlet CEMS 8 as a feedback to control the outlet $SO_2$ concentration to 23.5 mg/$Nm^3$; and 9) acquiring actual total ammonia flow rate of 438 kg/h and integrating and acquiring the actual amount of removed sulfur dioxide and integrating, to conduct the next round of control.

When a change rate of a product of the inlet gas amount and the inlet $SO_2$ concentration was less than or equal to 2%, the openness degree of main ammonia control valve 31 was left unchanged, and the actual $SO_2$ value of outlet CEMS 8 was controlled to 20-25 mg/$Nm^3$ through the auxiliary ammonia control valve 32. When the change rate of the product of the inlet gas amount and the inlet $SO_2$ concentration was more than 2%, the openness degree of main ammonia control valve 31 was calculated and adjusted according to the above steps, and the actual $SO_2$ value of outlet CEMS was controlled to 20-25 mg/$Nm^3$ by controling auxiliary ammonia control valve 32.

The resulting clean flue gas had the following characteristics:

$SO_2$: 23.6 mg/$Nm^3$;
total dust (including aerosol): 1.9 mg/$Nm^3$;
ammonia escape: 0.55 mg/$Nm^3$; and
ammonia recovery: 99.4%.

The present disclosure illustrates principles of the invention and is not intended to limit the invention to the particular embodiments illustrated. All patents, patent applications, scientific papers, and any other referenced materials mentioned herein are incorporated by reference in their entirety. The principles of the invention encompass any possible combination of some or all of the various embodiments mentioned herein, described herein and/or incorporated herein. The principles of the invention encompass any possible combination that also specifically excludes any one or some of the various embodiments mentioned herein, described herein and/or incorporated herein.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g. 2.3 to 9.4, 3 to 8, 4 to 7), and to each number 1, 2, 3, 4, 5, 6, 7, 8, 9, and 10 contained within the range. All percentages, ratios and proportions herein are by weight unless otherwise specified.

Thus, apparatus and methods for adding ammonia to a desulfurization system have been provided. Persons skilled in the art will appreciate that the present invention can be practiced by other than the described embodiments, which are presented for purposes of illustration rather than of limitation. The present invention is limited only by the claims that follow.

What is claimed is:

1. Apparatus for adding ammonia to an absorption solution in a flue-gas desulfurization system, the apparatus comprising:
   an emission monitoring system configured to provide a measure of an output sulfur dioxide characteristic; and
   valves configured to:
      add ammonia to the absorption solution at a base rate that is proportional to:
         a) a target sulfur dioxide removal rate defined as a difference between:
            1) a product of:
               a gas flow rate corresponding to an inlet of the desulfurization system and an inlet $SO_2$ concentration; and
            2) a product of:
               a gas flow rate corresponding to an outlet of the desulfurization system and a predetermined $SO_2$ outlet concentration; and
         b) a correction coefficient that includes a ratio of cumulative ammonia added to cumulative sulfur dioxide removed; and,
      then, control ammonia addition to the absorption solution to a second rate based on the measure of the output sulfur dioxide characteristic; and
   a distributed control system configured to:
      receive a steam generation rate from a boiler that produces the flue gas; and
      calculate an amount of required ammonia based, at least partly, on the steam generation rate,
   wherein the gas flow rate corresponding to the outlet is evaluated as the steam generation rate.

2. The apparatus of claim 1 wherein the valves include a main ammonia dispensing valve and an auxiliary ammonia dispensing valve, the auxiliary valve configured to dispense ammonia at a rate that is the base rate minus a rate at which ammonia is dispensed through the main valve.

3. The apparatus of claim 2 wherein the auxiliary valve is thrther configured to change its rate of dispensing ammonia based on the measure of the output sulfur dioxide characteristic.

4. The apparatus of claim 3 wherein:
   the measure of the sulfur dioxide characteristic is a rate of change of sulfur dioxide emission rate at the outlet of the desulfurization system; and
   the auxiliary valve is further configured to change its rate based on a predefined relationship between:
      the rate of change of sulfur dioxide emission at the outlet; and
      a fine adjustment value.

5. The apparatus of claim 4 wherein:
   the valves being configured to add ammonia includes:
      the main valve being configured to:
         pass ammonia; and
         be controlled with coarse control; and
   the valves being configured to control ammonia addition includes:
      the auxiliary valve being configured to:
         pass ammonia; and
         be controlled with fine control.

6. The apparatus of claim 1 wherein the correction coefficient is defined as:
   one half of: a ratio of actual molar number of added ammonia to actual molar number of removed sulfur dioxide.

7. The apparatus of claim 6 wherein the valves are flintier configured to regulate the base rate to be:
   no less than 90% of a product of:
      ammonia stoichiometrically required by the target sulfur dioxide removal rate and the correction coefficient; and
   no more than 110% of the product.

8. The apparatus of claim 7 wherein:
   the target sulfur dioxide removal rate depends on a predetermined outlet sulfur dioxide concentration; and
   the ammonia stoichiometrically required is:

$$\frac{\begin{pmatrix}\text{gas amount corresponding}\\\text{to the inlet of the}\\\text{desulfurization}\\\text{system, Nm}^3/\text{h}\end{pmatrix}\begin{pmatrix}SO_2\text{ concentration}\\\text{at the inlet,}\\\text{mg/Nm}^3\end{pmatrix} - \begin{pmatrix}\text{gas amount corresponding}\\\text{to the outlet of the}\\\text{desulfurization}\\\text{system, Nm}^3/\text{h}\end{pmatrix}\begin{pmatrix}\text{predetermined}\\SO_2\text{ concentration}\\\text{at the outlet, mg/Nm}^3\end{pmatrix}}{(1{,}000\text{ mg/g})(1000\text{ g/kg})(64\text{ mg }SO_2/34\text{ mg }NH_3)}.$$

9. The apparatus of claim 8 wherein:
   the gas amount corresponding to the inlet of the desulfurization system is received from an inlet continuous electronic monitoring instrument; and
   the $SO_2$ concentration at the inlet of the desulfurization system is received from an inlet continuous electronic monitoring instrument.

10. The apparatus of claim 8 wherein the gas amount corresponding to the outlet of the desulfurization system is received from an outlet continuous electronic monitoring instrument.

11. Apparatus for adding ammonia to an absorption solution in a flue-gas desulfurization system, the apparatus comprising:
   an emission monitoring system configured to provide a measure of an output sulfur dioxide characteristic;
   valves configured to:
      add ammonia to the absorption solution at a base rate that is proportional to:
         a) a target sulfur dioxide removal rate defined as a difference between:
            1) a product of:
               a gas flow rate corresponding to an inlet of the desulfurization system and an inlet $SO_2$ concentration; and
            2) a product of:
               a gas flow rate corresponding to an outlet of the desulfurization system and a predetermined $SO_2$ outlet concentration; and b) a correction coefficient that includes a ratio of cumulative ammonia added to cumulative sulfur dioxide removed; and, then, control ammonia addition to the absorption solution to a second rate based on the measure of the output sulfur dioxide characteristic; and a distributed control system configured to:

receive a boiler combustion airflow intake rate from a boiler that produces the flue gas; and calculate an amount of required ammonia based, at least partly, on the boiler combustion airflow intake rate;

wherein the gas flow rate corresponding to the inlet is evaluated as the boiler combustion airflow intake rate.

12. The apparatus of claim 11 wherein the valves include a main ammonia dispensing valve and an auxiliary ammonia dispensing valve, the auxiliary valve configured to dispense ammonia at a rate that is the base rate minus a rate at which ammonia is dispensed through the main valve.

13. The apparatus of claim 12 wherein the auxiliary valve is further configured to change its rate of dispensing ammonia based on the measure of the output sulfur dioxide characteristic.

14. The apparatus of claim 13 wherein:

the measure of the sulfur dioxide characteristic is a rate of change of sulfur dioxide emission rate at the outlet of the desulfurization system; and the auxiliary valve is further configured to change its rate based on a predefined relationship between:

the rate of change of sulfur dioxide emission at the outlet; and a fine adjustment value.

15. The apparatus of claim 14 wherein:

the valves being configured to add ammonia includes:

the main valve being configured to:

pass ammonia; and be controlled with coarse control; and the valves being configured to control ammonia addition includes:

the auxiliary valve being configured to:

pass ammonia; and be controlled with fine control.

16. The apparatus of claim 11 wherein the correction coefficient is defined as:

one half of: a ratio of actual molar number of added ammonia to actual molar number of removed sulfur dioxide.

17. The apparatus of claim 16 wherein the valves are further configured to regulate the base rate to be:

no less than 90% of a product of:

ammonia stoichiometrically required by the target sulfur dioxide removal rate and the correction coefficient; and no more than 110% of the product.

18. The apparatus of claim 17 wherein:

the target sulfur dioxide removal rate depends on a predetermined outlet sulfur dioxide concentration; and the ammonia stoichiometrically required is:

$$\frac{\begin{pmatrix} \text{gas amount corresponding} \\ \text{to the inlet of the} \\ \text{desulfurization} \\ \text{system, Nm}^3/\text{h} \end{pmatrix} \begin{pmatrix} SO_2 \text{ concentration} \\ \text{at the inlet,} \\ \text{mg/Nm}^3 \end{pmatrix} - \begin{pmatrix} \text{gas amount corresponding} \\ \text{to the outlet of the} \\ \text{desulfurization} \\ \text{system, Nm}^3/\text{h} \end{pmatrix} \begin{pmatrix} \text{predetermined} \\ SO_2 \text{ concentration} \\ \text{at the outlet, mg/Nm}^3 \end{pmatrix}}{(1{,}000 \text{ mg/g})(1000 \text{ g/kg})(64 \text{ mg } SO_2/34 \text{ mg } NH_3)}.$$

19. The apparatus of claim 18 wherein:

the gas amount corresponding to the inlet of the desulfurization system is received from an inlet continuous electronic monitoring instrument; and the $SO_2$ concentration at the inlet of the desulfurization system is received from an inlet continuous electronic monitoring instrument.

20. The apparatus of claim 18 wherein the gas amount corresponding to the outlet of the desulfurization system is received from an outlet continuous electronic monitoring instrument.

21. Apparatus for adding ammonia to an absorption solution in a flue-gas desulfurization system, the apparatus comprising:

an emission monitoring system configured to provide a measure of an output sulfur dioxide characteristic;

valves configured to:

add ammonia to the absorption solution at a base rate that is proportional to:

a) a target sulfur dioxide removal rate defined as a difference between:

1) a product of:

a gas flow rate corresponding to an inlet of the desulfurization system and an inlet $SO_2$ concentration; and 2) a product of:

a gas flow rate corresponding to an outlet of the desulfurization system and a predetermined $SO_2$ outlet concentration; and b) a correction coefficient that includes a ratio of cumulative ammonia added to cumulative sulfur dioxide removed; and, then, control ammonia addition to the absorption solution to a second rate based on the measure of the output sulfur dioxide characteristic; and a distributed control system configured to:

receive a boiler combustion airflow intake rate from a boiler that produces the flue gas; and calculate an amount of required ammonia based, at least partly, on the boiler combustion airflow intake rate, wherein the gas flow rate corresponding to the outlet is evaluated as the boiler combustion airflow intake rate.

22. The apparatus of claim 21 wherein the valves include a main ammonia dispensing valve and an auxiliary ammonia dispensing valve, the auxiliary valve configured to dispense ammonia at a rate that is the base rate minus a rate at which ammonia is dispensed through the main valve.

23. The apparatus of claim 22 wherein the auxiliary valve is further configured to change its rate of dispensing ammonia based on the measure of the output sulfur dioxide characteristic.

24. The apparatus of claim 23 wherein:
the measure of the sulfur dioxide characteristic is a rate of change of sulfur dioxide emission rate at the outlet of the desulfurization system; and
the auxiliary valve is further configured to change its rate based on a predefined relationship between:
the rate of change of sulfur dioxide emission at the outlet; and
a fine adjustment value.

25. The apparatus of claim 24 wherein:
the valves being configured to add ammonia includes:
the main valve being configured to:
pass ammonia; and
be controlled with coarse control; and
the valves being configured to control ammonia addition includes:
the auxiliary valve being configured to:
pass ammonia; and
be controlled with fine control.

26. The apparatus of claim 21 wherein the correction coefficient is defined as:
one half of: a ratio of actual molar number of added ammonia to actual molar number of removed sulfur dioxide.

27. The apparatus of claim 26 wherein the valves are further configured to regulate the base rate to be:
no less than 90% of a product of:
ammonia stoichiometrically required by the target sulfur dioxide removal rate and the correction coefficient; and
no more than 110% of the product.

28. The apparatus of claim 27 wherein;
the target sulfur dioxide removal rate depends on a predetermined outlet sulfur dioxide concentration; and
the ammonia stoichiometrically required is:

$$\frac{\begin{pmatrix} \text{gas amount corresponding} \\ \text{to the inlet of the} \\ \text{desulfurization} \\ \text{system, Nm}^3/\text{h} \end{pmatrix} \begin{pmatrix} SO_2 \text{ concentration} \\ \text{at the inlet} \\ \text{mg/Nm}^3 \end{pmatrix} - \begin{pmatrix} \text{gas amount corresponding} \\ \text{to the outlet of the} \\ \text{desulfurization} \\ \text{system, Nm}^3/\text{h} \end{pmatrix} \begin{pmatrix} \text{predetermined} \\ SO_2 \text{ concentration} \\ \text{at the outlet, mg/Nm}^3 \end{pmatrix}}{(1{,}000 \text{ mg/g})(1000 \text{ g/kg})(64 \text{ mg } SO_2/34 \text{ mg } NH_3)}.$$

29. The apparatus of claim 28 wherein:
the gas amount corresponding to the inlet of the desulfurization system is received from an inlet continuous electronic monitoring instrument; and
the $SO_2$ concentration at the inlet of the desulfurization system is received from an inlet continuous electronic monitoring instrument.

30. The apparatus of claim 28 wherein the gas amount corresponding to the outlet of the desulfurization system is received from an outlet continuous electronic monitoring instrument.

* * * * *